United States Patent
Dees et al.

(10) Patent No.: US 6,772,977 B2
(45) Date of Patent: Aug. 10, 2004

(54) AIRCRAFT WITH MULTIPURPOSE LOWER DECKS AND ASSOCIATED METHODS OF MANUFACTURE

(75) Inventors: Paul W. Dees, Woodinville, WA (US); Mithra M.K.V. Sankrithi, Lake Forest Park, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/278,717

(22) Filed: Oct. 22, 2002

(65) Prior Publication Data

US 2004/0075025 A1 Apr. 22, 2004

Related U.S. Application Data

(60) Provisional application No. 60/417,885, filed on Oct. 10, 2002.

(51) Int. Cl.[7] ............................................. B64D 11/00
(52) U.S. Cl. ................... 244/118.1; 244/130; 244/119; 244/118.5
(58) Field of Search ............................ 244/130, 118.1, 244/118.5, 118.6, 119, 55, 45 R, 15

(56) References Cited

U.S. PATENT DOCUMENTS

| | | | | |
|---|---|---|---|---|
| 2,874,922 A | * | 2/1959 | Whitcomb | 244/130 |
| 4,925,132 A | * | 5/1990 | Zider | 244/118.1 |
| 5,085,382 A | * | 2/1992 | Finkenbeiner | 244/118.1 |
| 5,086,996 A | | 2/1992 | Roeder et al. | |
| 5,474,260 A | | 12/1995 | Schwertfeger et al. | |
| 5,496,000 A | * | 3/1996 | Mueller | 244/118.1 |
| 5,529,263 A | * | 6/1996 | Rudolph | 244/55 |
| 5,542,626 A | | 8/1996 | Beuck et al. | |
| 5,752,673 A | | 5/1998 | Schliwa et al. | |
| 5,992,797 A | | 11/1999 | Seidel et al. | |
| 6,149,101 A | * | 11/2000 | Tracy | 244/130 |
| 6,152,400 A | | 11/2000 | Sankrithi et al. | |
| 6,575,406 B2 | * | 6/2003 | Nelson | 244/119 |
| 2002/0153454 A1 | * | 10/2002 | Seidel | 244/119 |

* cited by examiner

*Primary Examiner*—Galen L. Barefoot
(74) *Attorney, Agent, or Firm*—Perkins Coie LLP

(57) ABSTRACT

Transport aircraft, such as a transonic transport aircraft, having fuselages with multipurpose lower decks. In one embodiment, the fuselage is an "area-ruled" fuselage having a first fuselage portion, a second fuselage portion positioned aft of the first fuselage portion and at least proximate to a wing, and a third fuselage portion positioned aft of the second fuselage portion. The first fuselage portion can have a first dimension, the second fuselage portion can have a second dimension less than the first dimension, and the third fuselage portion can have a third dimension greater than the second dimension. The fuselage can further include an upper deck extending at least within the first and second fuselage portions, and a lower deck extending within the first fuselage portion. The upper deck can include a first passenger portion and the lower deck can include a second passenger portion, a cargo portion, or a second passenger portion and a cargo portion.

48 Claims, 5 Drawing Sheets

AIRCRAFT WITH MULTIPURPOSE LOWER DECKS AND ASSOCIATED METHODS OF MANUFACTURE

CROSS-REFERENCE TO RELATED APPLICATION

This application claims the benefit of pending U.S. Provisional Patent Application No. 60/417,885, filed on Oct. 10, 2002, and which is incorporated herein in its entirety by reference.

TECHNICAL FIELD

The following disclosure relates generally to multideck aircraft and, more particularly, to transonic aircraft having multipurpose lower decks for carrying passengers or passengers and cargo.

BACKGROUND

Conventional transport aircraft typically include a passenger cabin on an upper deck and a cargo hold on a lower deck. This configuration allows airlines to generate revenue by transporting both passengers and cargo over selected routes. On some routes, however, there is a greater demand for transporting passengers than cargo. On these routes, the airlines may accordingly prefer to use some of the space on the lower cargo deck for additional passenger seating.

One problem with adding passenger seating, sleeping cabins, or other passenger service facilities to lower decks is that lower decks typically provide insufficient standing height: One attempt to overcome this problem is disclosed in U.S. Pat. No. 5,752,673 to Schliwa et al ("Schliwa"). Schliwa discloses lowering the floor in an aisle section of the lower deck to provide at least enough clearance for a standing person of normal height.

Another problem with using lower cargo decks for passengers is providing sufficient structure beneath the lower decks to protect the passengers in the event of a crash landing. Regulations could require at least 30 inches of compressible structure beneath the lower deck if the lower deck is to be used to carry passengers. Lowering the floor of the lower deck as proposed by Schliwa compounds this problem because it further reduces the space beneath the lower deck.

One approach to meet the compressible structure requirement is disclosed in U.S. Pat. No. 5,542,626 to Beuck et al ("Beuck"). Beuck discloses an energy absorbing structural unit that is attached to the underside of an aircraft fuselage. The structural unit proposed by Beuck is an add-on feature of considerable size that extends downwardly and outwardly around the lower half of the fuselage cross-section to protect a lower passenger deck in the event of an impact. Because of its size and complexity, implementing the Beuck approach may add considerable cost, weight and aerodynamic drag to an aircraft.

SUMMARY

Aspects of the invention are directed to aircraft, such as transonic aircraft, having multipurpose lower decks usable for transporting passengers, cargo, or passengers and cargo. In one aspect, an aircraft fuselage includes a first fuselage portion and a second fuselage portion positioned aft of the first fuselage portion. The first fuselage portion can have a first dimension at least approximately parallel to a yaw axis, and the second fuselage portion can have a second dimension at least approximately parallel to the yaw axis that is less than the first dimension. The aircraft fuselage can further include a first deck and a second deck. The first deck can extend at least within the first and second fuselage portions, and can have a first passenger portion configured to accommodate passengers. The second deck can extend at least within the first fuselage portion, and can have a second passenger portion configured to accommodate passengers. In another aspect, the second deck can further include a cargo portion configured to carry cargo containers.

In a further aspect of the invention, the aircraft fuselage can also include a third fuselage portion positioned aft of the second fuselage portion. The third fuselage portion can have a third dimension at least approximately parallel to the yaw axis that is greater than the second dimension. The first deck can extend within the third fuselage portion.

In still another aspect of the invention, a method for manufacturing an aircraft includes providing a first fuselage portion and attaching a second fuselage portion to the first fuselage portion aft of the first fuselage portion. The first fuselage portion can have a first dimension at least approximately parallel to a yaw axis, and the second fuselage portion can have a second dimension at least approximately parallel to the yaw axis that is less than the first dimension. The method can further include positioning a wing at least proximate to the second fuselage portion, extending at least generally outboard relative to the second fuselage portion. The method can additionally include positioning a first deck at least within the first and second fuselage portions, and positioning a second deck at least within the first fuselage portion. The first deck can include a first passenger portion configured to accommodate passengers, and the second deck can include a second passenger portion configured to accommodate passengers.

DETAILED DESCRIPTION

Figure 1:
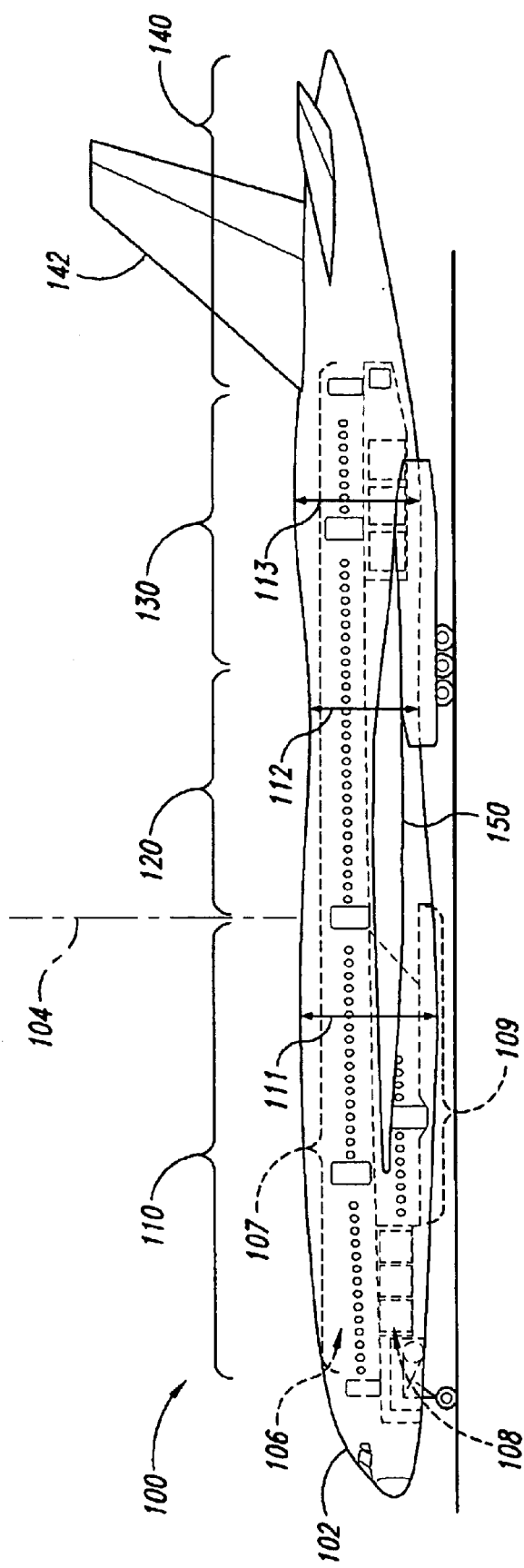
FIG. 1 is a partially hidden side elevation view of an aircraft having a lower deck configured in accordance with an embodiment of the invention.

The following disclosure describes transport aircraft, such as transonic transport aircraft, having lower decks configured to carry passengers or passengers and cargo. Certain specific details are set forth in the following description and in FIGS. 1–5 to provide a thorough understanding of various embodiments of the invention. Details of well-known structures and systems often associated with aircraft are not set forth in the following disclosure, however, to avoid unnecessarily obscuring the various embodiments of the invention. Further, those of ordinary skill in the art will understand that they can practice other embodiments of the invention without several of the details described below.

In the drawings, identical reference numbers identify identical or at least generally similar elements. To facilitate the discussion of any particular element, the most significant digit or digits of any reference number refer to the figure in which that element is first introduced. For example, element 110 is first introduced and discussed with reference to FIG. 1.

FIG. 1 is a partially hidden side elevation view of an aircraft 100 having a fuselage 102 with a multipurpose lower deck 108 configured in accordance with an embodiment of the invention. In one aspect of this embodiment, the fuselage 102 includes a first fuselage portion 110 and a second fuselage portion 120 positioned aft of the first fuselage portion 110. The second fuselage portion 120 can be positioned at least proximate to a wing 150. The fuselage 102 can further include a third fuselage portion 130 positioned aft of the second fuselage portion 120, and an empennage portion 140 positioned aft of the third fuselage portion 130. The empennage portion 140 can include a vertical stabilizer 142 for controlling motion of the aircraft 100 about a yaw axis 104 in flight.

In another aspect of this embodiment, the fuselage 102 is an "area-ruled" fuselage configured to reduce transonic wave drag. For example, the first fuselage portion 110 can have a first dimension 111 at least approximately parallel to the yaw axis 104, the second fuselage portion 120 can have a second dimension 112 at least approximately parallel to the yaw axis 104 and less than the first dimension 111, and the third fuselage portion 130 can have a third dimension 113 at least approximately parallel to the yaw axis 104 and greater than the second dimension 112. In this manner, the illustrated fuselage vertical area-ruling contributes to the overall cross-sectional area-ruling of the fuselage which can reduce transonic wave drag.

In a further aspect of this embodiment, the fuselage 102 includes an upper deck 106 having a first passenger portion 107 configured to accommodate passengers (not shown). The upper deck 106 can be positioned at least generally above the wing 150 and can extend within the first fuselage portion 110, the second fuselage portion 120, and the third fuselage portion 130. The multipurpose lower deck 108 (or "lower deck 108") can be positioned at least generally below the wing 150 and can extend within the first fuselage portion 110 beneath the upper deck 106. The lower deck 108 can include a second passenger portion 109 configured to accommodate passengers. Accordingly, the lower deck 108 is positioned in the portion of the fuselage 102 that, by virtue of the area rule, has additional space available to accommodate the second passenger portion 109. In other embodiments, the lower deck 108 can extend beyond the first fuselage portion 110, for example, at least partially into the second fuselage portion 120.

Figure 2:
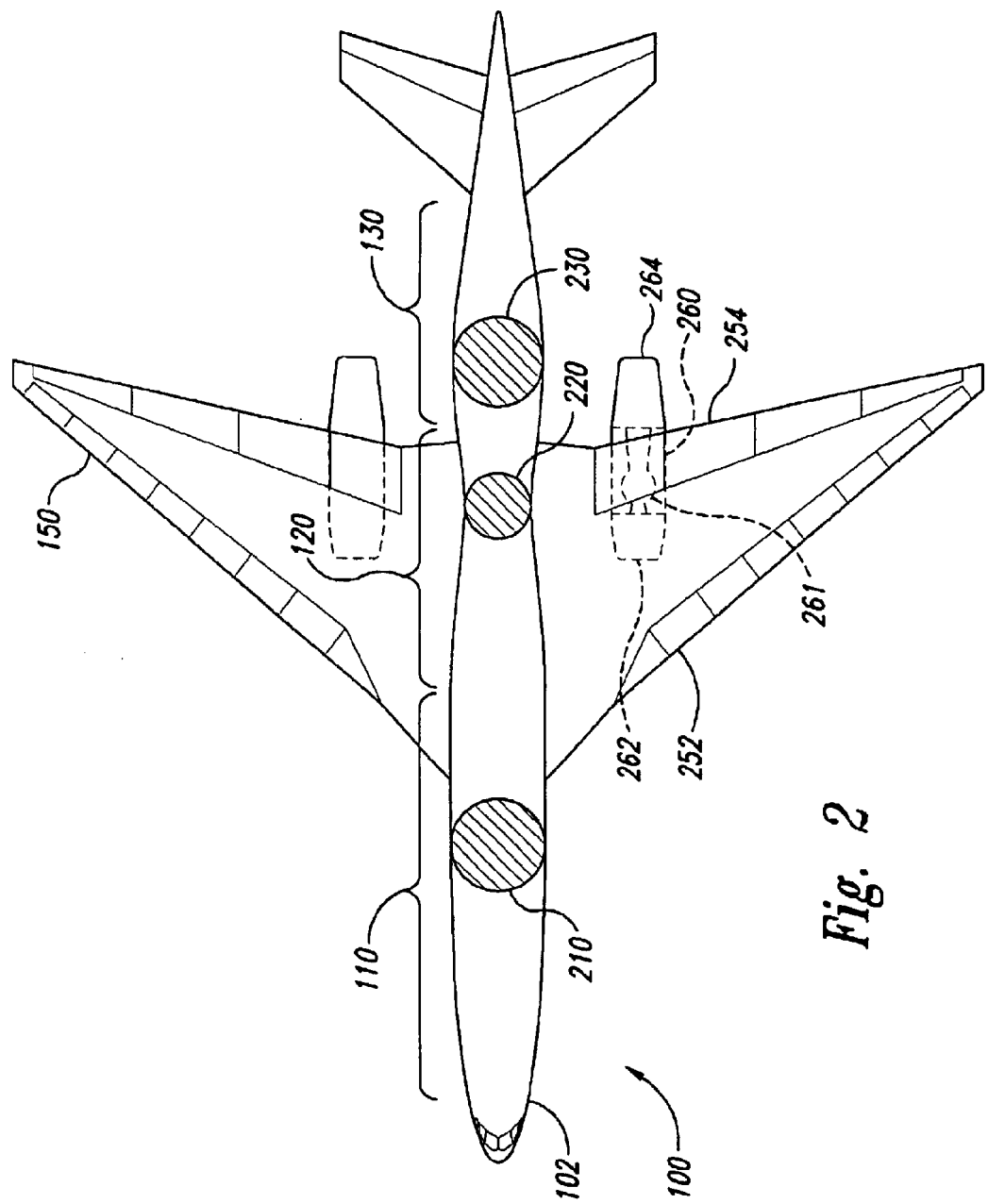
FIG. 2 is a partially hidden top plan view of the aircraft of FIG. 1 configured in accordance with an embodiment of the invention.

FIG. 2 is a partially hidden top plan view of the aircraft 100 of FIG. 1 configured in accordance with an embodiment of the invention. In one aspect of this embodiment, the first fuselage portion 110 has a first cross-sectional area 210, the second fuselage portion 120 has a second cross-sectional area 220 that is less than the first cross-sectional area 210, and the third fuselage portion 130 has a third cross-sectional area 230 that is greater than the second cross-sectional area 220. Accordingly, the cross-sectional area distribution of the fuselage 102 is reduced at the second fuselage portion 120 adjacent to the wing 150 to maintain a smooth and gradual cross-sectional area distribution for the aircraft 100 consistent with the area rule.

In another aspect of this embodiment, the aircraft 100 includes an engine nacelle 260 fixedly attached to the wing 150. The engine nacelle 260 can house an engine 261 for providing thrust to the aircraft 100, and can include an air inlet 262 positioned forward of the engine 261 and an exhaust gas outlet 264 positioned aft of the engine 261. The wing 150 can include a leading edge region 252 and a trailing edge region 254. In a further aspect of this embodiment, the air inlet 262 of the engine nacelle 260 is positioned aft of the leading edge region 252, and the exhaust gas outlet 264 is positioned aft of the trailing edge region 254. In other embodiments, the engine nacelle 260 can have other positions on the aircraft 100. For example, in another embodiment, the air inlet 262 can be positioned forward of the leading edge region 252. In a further embodiment, the engine nacelle 260 can be fixedly attached to the fuselage 102.

Figure 3:
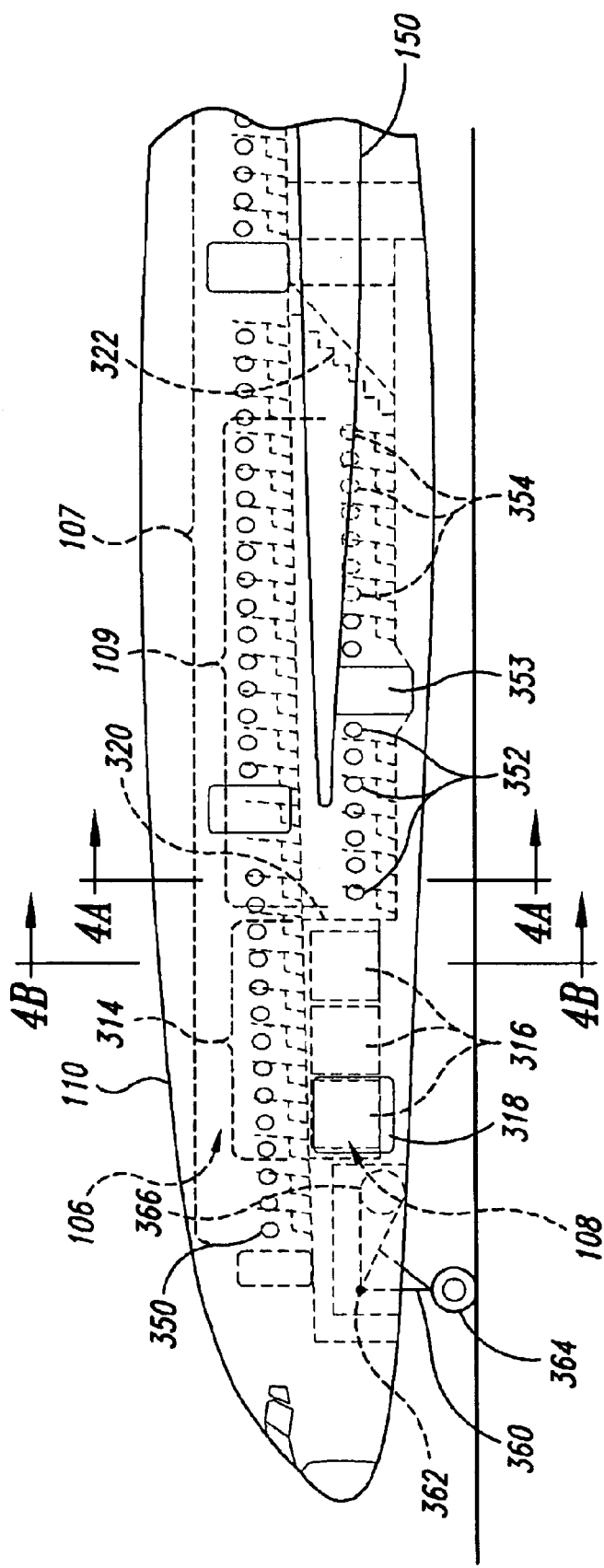
FIG. 3 is a partially hidden enlarged side elevation view of a forward portion of the fuselage shown in FIGS. 1 and 2 configured in accordance with an embodiment of the invention.

FIG. 3 is a partially hidden enlarged side elevation view of the first fuselage portion 110 showing the lower deck 108 configured in accordance with an embodiment of the invention. In one aspect of this embodiment, the lower deck 108 further includes a cargo portion 314 positioned forward of the second passenger portion 109. The cargo portion 314 can be configured to carry cargo containers 316, such as LD-3 cargo containers, or palletized cargo. The first fuselage portion 110 can include a cargo door 318 positioned adjacent to the cargo portion 314 to allow the cargo containers 316 to be moved into and out of the cargo portion 314.

In another aspect of this embodiment, the lower deck 108 further includes a separator 320 extending between the cargo portion 314 and the second passenger portion 109. The separator 320 can be a rigid or semi-rigid structure providing a barrier between the cargo portion 314 and the second passenger portion 109. In other embodiments, the separator 320 can be a flexible structure, such as a cargo net. In a further aspect of this embodiment, the separator 320 is selectively positionable at different longitudinal stations of the lower deck 108. In this way, the relative sizes of the cargo portion 314 and the second passenger portion 109 can be adjusted to accommodate different cargo and passenger loads. In other embodiments, the longitudinal station of the separator 320 can be at least generally non-adjustable.

In yet another aspect of this embodiment, the first fuselage portion 110 includes a first row of passenger windows 350 positioned adjacent to the upper deck 106, and a second row of passenger windows 352 positioned adjacent to the lower deck 108. The second row of passenger windows 352 extends only part of the way aft relative to the second passenger portion 109 because it is blocked by a portion of the wing 150, such as a forward portion of the wing or strake. To provide the passengers seated next to the wing 150 with a view out of the aircraft 100, the first fuselage portion 110 can include a row of simulated external-view windows 354 extending aft from the second row of passenger windows 352 adjacent to the wing 150. The simulated external-view windows 354 can include "virtual window technology" such as video displays that simulate conventional external-view windows and provide passengers seated adjacent to the wing 150 with a simulated view out of the second passenger portion 109. In other embodiments, the simulated external-view windows 354 can be omitted.

In a further aspect of this embodiment, the first fuselage portion 110 includes a stairway 322 extending between the upper deck 106 and the lower deck 108 to accommodate passenger travel between the first passenger portion 107 and the second passenger portion 109. In other embodiments, the first fuselage portion 110 can include other types of passageways for passenger travel between the upper deck 106 and the lower deck 108. For example, in another embodiment, the first fuselage portion 110 can include an elevator. In further embodiments, the first fuselage portion can include an escalator or a ladder. The first fuselage portion 110 can also include a passenger door 353 providing passengers with an additional way to enter or exit the second passenger portion 109. In certain embodiments, the passenger door 353 can be used as an emergency exit.

In still another aspect of this embodiment, the first fuselage portion 110 includes an aft-retracting landing gear 360 housed in a wheel well 366 positioned forward of the lower deck 108. After takeoff, the landing gear 360 can pivot rearwardly and upwardly about a trunnion 362 to move a nosewheel or wheel truck 364 from a static deployed position (shown in FIG. 3) to a static retracted position within the wheel well 366. Positioning the trunnion 362 in a forward portion of the wheel well 366 can cause the landing gear 360 to collapse into the wheel well 366 in the event of a landing gear collapse, thus avoiding damage to the lower deck 108. In other embodiments, however, the landing gear 360 can retract in other directions. For example, in another embodiment, the landing gear 360 can retract forward into an appropriately configured wheel well. In a further embodiment, the landing gear 360 can retract sideways into an appropriately configured wheel well.

One feature of embodiments of the invention shown in FIGS. 1–3 is that the second passenger portion 109 is positioned in the first fuselage portion 110 and, as a result, the first fuselage portion 110 requires additional cross-sectional area to provide the necessary standing height. One advantage of this feature is that the additional cross-sectional area can be efficiently utilized to provide the aircraft 100 with a generally smooth and gradual cross-sectional area distribution for reducing wave drag at transonic speeds in accordance with the area rule.

Figure 4A:
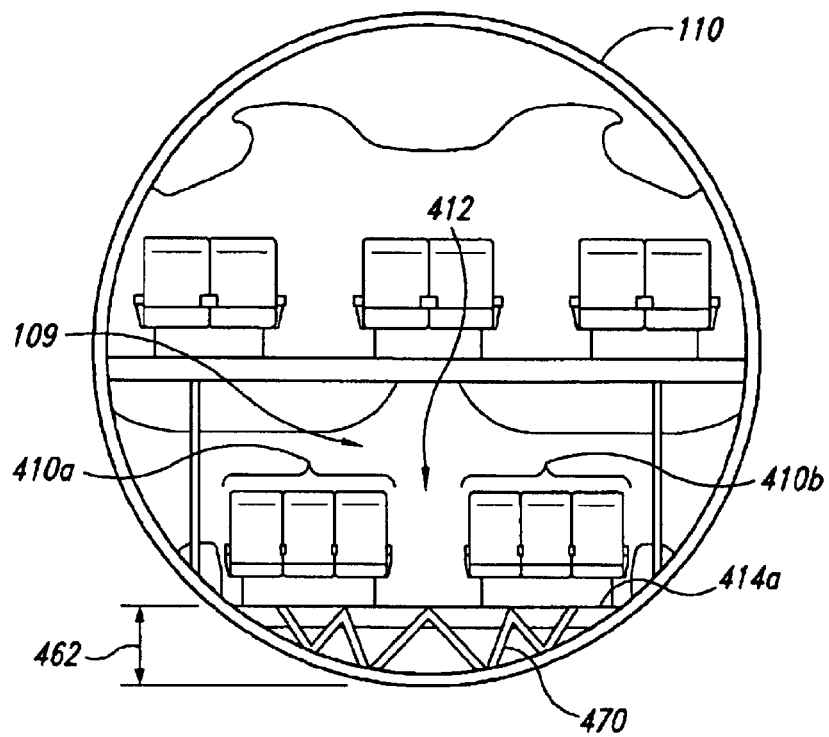
FIGS. 4A–B are enlarged cross-sectional elevation views of the forward fuselage portion of FIG. 3 configured in accordance with embodiments of the invention and taken substantially along lines 4A—4A and 4B—4B in FIG. 3, respectively.
Figure 4B:
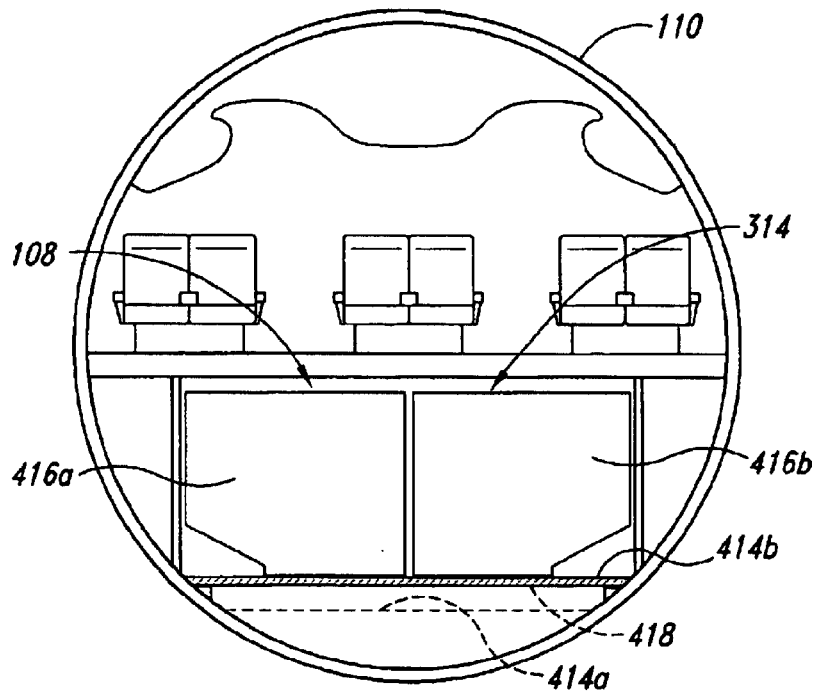

FIGS. 4A–B are enlarged cross-sectional elevation views of the first fuselage portion 110 configured in accordance with embodiments of the invention and taken substantially along lines 4A–4A and 4B–4B in FIG. 3, respectively. Referring first to FIG. 4A, in one aspect of this embodiment, the second passenger portion 109 includes a first passenger seat section 410a and a second passenger seat section 410b positioned on opposite sides of a central passenger aisle 412. In the illustrated embodiment, each passenger seat section 410a,b includes three-abreast passenger seating. In other embodiments, the second passenger portion 109 can include other passenger seat arrangements. For example, in another embodiment, the passenger aisle 412 can be positioned off-center and the second passenger portion 109 can include two-abreast passenger seating on one side of the passenger aisle 412 and three-abreast passenger seating on the other. In a further embodiment, the second passenger portion 109 can include two passenger aisles separating three passenger seat sections. In this further embodiment, each passenger seat section can include one- or two-abreast passenger seating. In still other embodiments, the second passenger portion 109 can include still other passenger seat arrangements depending on factors such as fuselage, aisle and/or seat width, or class of service.

In another aspect of this embodiment, the second passenger portion 109 includes a first floor 414a positioned above an energy-absorbing structure 470. The energy-absorbing structure 470 can be configured to absorb the energy from an impact to the bottom of the first fuselage portion 110 for protection of the passengers seated in the second passenger portion 109. Such an impact could occur, for example, during a crash landing. In one embodiment, the energy-absorbing structure 470 can include energy-absorbing compressible materials, such as aluminum honeycomb. In another embodiment, the energy-absorbing structure can include additional fuselage frame members. In other embodiments, other types of energy-absorbing structure can be included.

In a further aspect of this embodiment, the first floor 414a can be spaced apart from the bottom of the first fuselage portion 110 by a distance 462, and the distance 462 can be equal to about 30 inches. In other embodiments, the distance 462 can have other values. For example, in another embodiment, the distance 462 can be greater than 30 inches, for example, about 36 inches. In a further embodiment, the distance 462 can be about 24 inches. In still other embodiments, the distance 462 can have other values depending on factors such as the energy-absorbing capability of the energy-absorbing structure 470 or the applicable regulations.

Referring now to FIG. 4B, in one aspect of this embodiment, the cargo portion 314 is configured to carry standard Unit Load Devices ("ULDs"), such as LD-3 cargo containers 416a and 416b, in a two-abreast arrangement. In other embodiments, the cargo portion 314 can be configured to carry other types of containerized cargo. For example, in another embodiment, the cargo portion 314 can be configured to carry LD-2 or LD-1 cargo containers in two-abreast or other arrangements. In further embodiments, the cargo portion 314 can be configured to carry palletized cargo or palletized cargo and standard ULDs.

In a further aspect of this embodiment, the cargo portion 314 can include a second floor 414b positioned above the first floor 414a, if required to accommodate the cargo containers 416a and 416b. The second floor 414b can include floor inserts 418 removably installed across the lower deck 108. Accordingly, use of the removable floor inserts 418 and the movable separator 320 (FIG. 3) may singly or in combination enable the lower deck 108 to be selectively configured to carry cargo, passengers, or cargo and passengers in different proportions.

Figure 5:
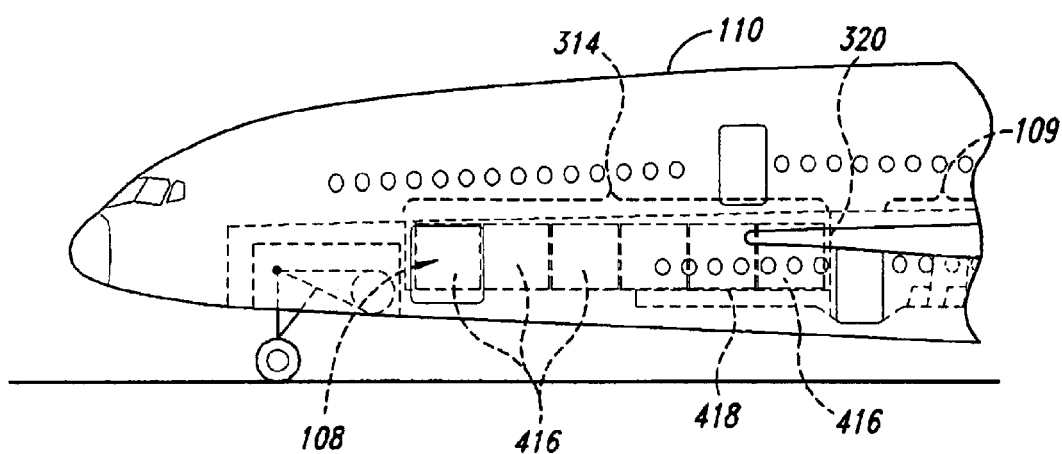
FIG. 5 is a partially hidden enlarged side elevation view of the forward fuselage portion shown in FIGS. 1–3 configured in accordance with another embodiment of the invention.

FIG. 5 is a partially hidden enlarged side elevation view of the first fuselage portion 110 with the lower deck 108 configured in accordance with another embodiment of the invention. In one aspect of this embodiment, one or more of the removable floor inserts 418 have been installed in the lower deck 108 to extend the cargo portion 314 further aft as compared to the embodiment shown in FIG. 3. In addition, the movable separator 320 has also been positioned further aft to separate the extended cargo portion 314 from the reduced second passenger portion 109. Accordingly, in this embodiment the cargo portion 314 is configured to carry six pairs of containerized cargo, such as six pairs of LD-3 cargo containers 416. In other embodiments, the relative sizes of the cargo portion 314 and the second passenger portion 109 can be adjusted differently depending on other factors, such as the relative demand for cargo capacity versus passenger capacity.

From the foregoing, it will be appreciated that specific embodiments of the invention have been described herein for purposes of illustration, but that various modifications may be made without deviating from the spirit and scope of the invention. For example, although selected embodiments have been described above in the context of mid-wing aircraft, the present invention is equally applicalbe to aft-wing aircraft, such as delta-wing aircraft having a small forward wing or canard. Accordingly, the invention is not limited except as by the appended claims.

We claim:

1. An aircraft fuselage having a yaw axis, the aircraft fuselage comprising:
   a first fuselage portion having a first dimension at least approximately parallel to the yaw axis;
   a second fuselage portion positioned aft of the first fuselage portion and at least proximate to a wing, the second fuselage portion having a second dimension at least approximately parallel to the yaw axis, the second dimension being less than the first dimension;
   a first deck extending at least within the first and second fuselage portions, the first deck including a first passenger portion configured to accommodate passengers; and
   a second deck positioned below the first deck and at least generally below the wing, the second deck extending at least within the first fuselage portion, the second deck including a second passenger portion configured to accommodate passengers.

2. The aircraft fuselage of claim 1, further comprising a third fuselage portion positioned aft of the second fuselage portion and having a third dimension at least approximately parallel to the yaw axis, the third dimension being greater than the second dimension, wherein the first deck extends within the third fuselage portion.

3. The aircraft fuselage of claim 1, further comprising a third fuselage portion positioned aft of the second fuselage portion and having a third dimension at least approximately parallel to the yaw axis, the third dimension being greater than the second dimension, wherein the first deck extends within the third fuselage portion, and wherein the first fuselage portion has a first cross-sectional area, the second fuselage portion has a second cross-sectional area less than the first cross-sectional area, and the third fuselage portion has a third cross-sectional area greater than the second cross-sectional area.

4. The aircraft fuselage of claim 1 wherein the second deck further includes a cargo portion configured to carry cargo containers, and wherein the first fuselage portion further includes a cargo door positioned to move the cargo containers into and out of the cargo portion.

5. The aircraft fuselage of claim 1 wherein the second deck further includes a cargo portion configured to carry cargo containers, wherein the first fuselage portion further includes a cargo door positioned to move the cargo containers into and out of the cargo portion, and wherein the cargo portion is positioned forward of the second passenger portion.

6. The aircraft fuselage of claim 4 wherein the cargo portion is configured to carry at least two LD-3 cargo containers, the cargo door being configured to allow the LD-3 cargo containers to be moved into and out of the cargo portion.

7. The aircraft fuselage of claim 4 wherein the second deck further includes a separator positioned between the cargo portion and the second passenger portion to provide a physical barrier between the cargo portion and the second passenger portion.

8. The aircraft fuselage of claim 4 wherein the second deck further includes a movable separator positioned between the cargo portion and the second passenger portion, wherein the movable separator is selectively positionable between at least a first longitudinal station and a second longitudinal station to adjust the relative sizes of the cargo portion and the second passenger portion.

9. The aircraft fuselage of claim 1 wherein the first fuselage portion further includes a first row of windows positioned at least proximate to the first passenger portion and a second row of windows positioned at least proximate to the second passenger portion.

10. The aircraft fuselage of claim 1 wherein the first fuselage portion further includes at least one simulated external-view window positioned at least proximate to the second passenger portion.

11. The aircraft fuselage of claim 1 wherein the second passenger portion includes first and second passenger seat sections positioned on opposite sides of a central passenger aisle.

12. The aircraft fuselage of claim 1 wherein the second passenger portion includes first and second passenger aisles separating first, second and third passenger seat sections.

13. The aircraft fuselage of claim 1, further comprising a passageway extending between the first and second decks to accommodate passenger travel between the first and second decks.

14. The aircraft fuselage of claim 13 wherein the passageway includes an elevator.

15. The aircraft fuselage of claim 1 wherein the second passenger portion includes a first floor, and wherein the second deck further includes a cargo portion having a second floor, the second floor being vertically offset from the first floor.

16. The aircraft fuselage of claim 1 wherein at least a region of the second passenger portion is optionally configurable as a cargo portion configured to carry cargo containers.

17. The aircraft fuselage of claim 16 wherein the region of the second passenger portion optionally configurable as the cargo portion is configured to removably receive floor inserts to support the cargo containers.

18. The aircraft fuselage of claim 1 wherein the first fuselage portion further includes an energy-absorbing structure positioned at least approximately beneath the second passenger portion, the energy-absorbing structure being configured to absorb the energy from an impact to the first fuselage portion from below the second passenger portion.

19. The aircraft fuselage of claim 18 wherein the second passenger portion includes a passenger aisle, and the energy-absorbing structure extends to a depth of about 30 inches or more beneath the passenger aisle.

20. The aircraft fuselage of claim 1, further comprising an aft-retracting nose landing gear positioned forward of the second deck.

21. The aircraft fuselage of claim 1 wherein the first deck is positioned at least generally above the wing.

22. An aircraft fuselage comprising:
   a first fuselage portion having a first cross-sectional area;
   a second fuselage portion positioned aft of the first fuselage portion and at least approximately adjacent to a wing, the second fuselage portion having a second cross-sectional area less than the first cross-sectional area;
   a third fuselage portion positioned aft of the second fuselage portion, the third fuselage portion having a third cross-sectional area greater than the second cross-sectional area;
   a first deck extending within the first, second and third fuselage portions, the first deck including a first passenger portion configured to accommodate passengers; and a second deck positioned below the first deck and at least generally below the wing, the second deck extending at least within the first fuselage portion, the second deck including a second passenger portion configured to accommodate passengers.

23. The aircraft fuselage of claim 22 wherein the second fuselage portion is configured to support a wing, and wherein the aircraft fuselage further comprises an empennage portion positioned aft of the third fuselage portion, the empennage portion configured to support at least one stabilizer surface extending outwardly from the empennage portion.

24. The aircraft fuselage of claim 22 wherein the second deck further includes a cargo portion configured to carry cargo containers.

25. The aircraft fuselage of claim 24 wherein the second deck further includes a movable separator positioned between the cargo portion and the second passenger portion, wherein the movable separator is selectively positionable between at least a first longitudinal station and a second longitudinal station to adjust the relative sizes of the cargo portion and the second passenger portion.

26. The aircraft fuselage of claim 22 wherein the second passenger portion includes first and second passenger seat sections positioned on opposite sides of a central passenger aisle.

27. The aircraft fuselage of claim 22 further comprising a passageway extending between the first and second decks to accommodate passenger travel between the first and second decks.

28. The aircraft fuselage of claim 22 wherein at least a region of the second passenger portion is optionally configurable as a cargo portion configured to carry cargo containers.

29. The aircraft fuselage of claim 22 wherein the first fuselage portion further includes an energy-absorbing structure positioned at least approximately beneath the second passenger portion, the energy-absorbing structure being configured to absorb the energy from an impact to the first fuselage portion from below the second passenger portion.

30. The aircraft fuselage of claim 22, further comprising an aft-retracting landing gear positioned forward of the second deck.

31. The aircraft fuselage of claim 22, further comprising at least one passenger door positioned adjacent to the second deck and configured to allow passengers to at least exit the second deck.

32. The aircraft fuselage of claim 22 wherein the first deck is positioned at least generally above the wing.

33. An aircraft having a yaw axis, the aircraft comprising:
a fuselage having:
a first fuselage portion with a first dimension at least approximately parallel to the yaw axis;
a second fuselage portion positioned aft of the first fuselage portion, the second fuselage portion having a second dimension at least approximately parallel to the yaw axis, the second dimension being less than the first dimension;
a first deck extending at least within the first and second fuselage portions, the first deck including a first passenger portion configured to accommodate passengers;
a second deck positioned below the first deck and extending at least within the first fuselage portion, the second deck including a second passenger portion configured to accommodate passengers; and
a wing extending at least generally outboard from the second fuselage portion at least generally above the second deck.

34. The aircraft of claim 33, wherein the wing includes a leading edge region and a trailing edge region, and wherein the aircraft further comprises at least one engine nacelle fixedly attached to the wing, the engine nacelle including an air inlet positioned aft of the leading edge region and an exhaust gas outlet positioned aft of the trailing edge region.

35. The aircraft of claim 33 wherein the fuselage further comprises a third fuselage portion positioned aft of the second fuselage portion and having a third dimension at least approximately parallel to the yaw axis, the third dimension being greater than the second dimension, the first deck extending within the third fuselage portion.

36. The aircraft of claim 35 wherein the first fuselage portion has a first cross-sectional area, wherein the second fuselage portion has a second cross-sectional area less than the first cross-sectional area, and wherein the third fuselage portion has a third cross-sectional area greater than the second cross-sectional area.

37. The aircraft of claim 33 wherein the first deck is positioned at least generally above the wing.

38. The aircraft of claim 33 wherein the second deck further includes a cargo portion configured to accommodate cargo containers.

39. The aircraft of claim 33 wherein the wing includes a leading edge region, and wherein the aircraft further comprises at least one engine nacelle fixedly attached to the wing, the engine nacelle including an air inlet positioned aft of the leading edge region.

40. A system for transporting passengers, cargo, or passengers and cargo by air at sonic or near-sonic speeds, the system comprising:
first deck means for carrying a first plurality of passengers within a first fuselage portion having a first cross-sectional area, a second fuselage portion positioned aft of the first fuselage portion and at least approximately adjacent to a wing, the second fuselage portion having a second cross-sectional area less than the first cross-sectional area, and a third fuselage portion positioned aft of the second fuselage portion, the third fuselage portion having a third cross-sectional area greater than the second cross-sectional area; and
second deck means for carrying a second plurality of passengers at least within the first fuselage portion, the second deck means being vertically offset from the first deck means and positioned at least generally below the wing.

41. The system of claim 40 wherein the first deck means is positioned at least generally above the wing.

42. The system of claim 40, further comprising means for carrying cargo containers within the second deck means.

43. The system of claim 40, further comprising means for providing the fuselage with a generally smooth and gradual cross-sectional area distribution.

44. The system of claim 40, further comprising means for absorbing energy from an impact to the fuselage at least proximate to the second deck means.

45. A method for manufacturing an aircraft having a yaw axis, the method comprising:
providing a first fuselage portion having a first dimension at least approximately parallel to the yaw axis;
attaching a second fuselage portion to the first fuselage portion aft of the first fuselage portion, the second fuselage portion having a second dimension at least approximately parallel to the yaw axis, the second dimension being less than the first dimension;
positioning a wing at least proximate to the second fuselage portion, the wing extending at least generally outboard from the second fuselage portion;

positioning a first deck at least within the first and second fuselage portions, the first deck including a first passenger portion configured to accommodate passengers; and positioning a second deck below the first deck and at least generally below the wing, the second deck extending within the first fuselage portion and including a second passenger portion configured to accommodate passengers.

46. The method of claim 45 wherein positioning a first deck at least within the first and second fuselage portions includes positioning a first deck at least generally above the wing.

47. The method of claim 45, further comprising positioning a cargo portion on the second deck, the cargo portion being configured to carry cargo containers.

48. The method of claim 45 wherein the wing has a leading edge region and a trailing edge region, wherein the method further comprises attaching an engine nacelle to the wing, the engine nacelle having an air inlet positioned forward of an engine and an exhaust gas outlet positioned aft of the engine, the air inlet being positioned aft of the leading edge region of the wing.

* * * * *